US006543094B2

(12) United States Patent
D'Addario

(10) Patent No.: US 6,543,094 B2
(45) Date of Patent: Apr. 8, 2003

(54) CABLE MANAGEMENT TIE WRAP

(75) Inventor: James D'Addario, Old Westbury, NY (US)

(73) Assignee: J. D'Addario & Co., Inc., Farmingdale, NY (US)

( * ) Notice: Subject to any disclaimer, the term of this patent is extended or adjusted under 35 U.S.C. 154(b) by 0 days.

(21) Appl. No.: 09/942,794

(22) Filed: Aug. 30, 2001

(65) Prior Publication Data

US 2003/0041416 A1 Mar. 6, 2003

(51) Int. Cl.[7] .................. A44B 21/00; B65D 63/00; F16G 11/14; F16L 33/00
(52) U.S. Cl. .................. 24/16 PB; 24/16 R; 24/17 B; 24/459; 24/300; 24/573.1
(58) Field of Search ................ 24/16 PB, 16 R, 24/300, 370, 712, 715.3, 482, 17 B, 3.13; 2/237

(56) References Cited

U.S. PATENT DOCUMENTS

| 186,927 | A | * | 2/1877 | Dulin ...................... 24/17 B |
| 268,407 | A | * | 12/1882 | Hughes ..................... 24/17 B |
| 3,048,906 | A | * | 8/1962 | Patterson ................. 24/16 PB |
| 3,721,750 | A | * | 3/1973 | Countryman ............... 24/16 R |
| 3,953,911 | A | * | 5/1976 | Fishack ..................... 24/16 R |
| 5,062,184 | A | * | 11/1991 | Rowland ..................... 24/300 |
| 5,081,746 | A | * | 1/1992 | Czwartacki ................. 24/17 B |
| 5,230,489 | A | * | 7/1993 | White et al. .............. 24/16 PB |
| 5,729,872 | A |   | 3/1998 | Ginocchio |
| 5,893,456 | A | * | 4/1999 | Bosmans .................. 24/16 PB |
| 5,896,623 | A | * | 4/1999 | Martin ...................... 24/16 PB |
| 6,292,987 | B1 | * | 9/2001 | Combes ....................... 24/459 |
| 6,389,659 | B1 | * | 5/2002 | Jacobs ....................... 24/573.1 |
| 6,393,670 | B1 | * | 5/2002 | Bealmear .................. 24/16 PB |

* cited by examiner

Primary Examiner—Victor Sakran
(74) Attorney, Agent, or Firm—Gerald T. Bodner

(57) ABSTRACT

A cable tie wrap for bundling cable includes a coupling body and an elastic cord defining a loop attached to a cord connection end of the coupling body. The coupling body includes a projection formed on an outer surface thereof for removably hooking the loop defined by the cord to the coupling body. The projection includes an annular groove and a retaining lip formed thereon for removably nesting the elastic cord therein. The coupling body may further include at least one cord retention rib formed on the outer surface thereof for preventing the cord from slipping off the outer surface of the body. The tie wrap further preferably includes means for attaching the tie wrap to a cord to be bundled so that the tie wrap is not misplaced when not in use. A method for securing a bundle of cables generally includes the steps of gathering a bundle of cable together, wrapping the elastic cord around the bundle of cable and hooking the loop defined at one end of the cord to the projection of the coupling body to form a band around the bundle of cable thereby securing the bundled cable.

10 Claims, 5 Drawing Sheets

CABLE MANAGEMENT TIE WRAP

FIELD OF THE INVENTION

The present invention relates generally to tie wraps for wrapping or bundling electrical wires or cables, and more particularly to an elastic tie wrap that can be attached directly to a cable for repeated use.

BACKGROUND OF THE INVENTION

Cable management for computer systems, audio systems, home theater systems or electronic installations often requires some type of device to neatly bundle cables together or to hold a coiled up cable together when being transported. Devices for bundling electrical wires or cables for these purposes are well known.

The most common tie wrap for bundling electrical wires or cables is a flexible strip made from a plastic, such as nylon, and having a locking mechanism at one end. The strip is wrapped around a bundled cable and the free end of the strip opposite the locking mechanism is inserted through an aperture of the locking mechanism. The strip typically includes a number of ratchet teeth formed thereon that engage a projection within the aperture of the locking mechanism thereby allowing only one way insertion. Thus, once engaged, the locking mechanism does not allow removal of the free end of the strip. Although simple in design, one obvious disadvantage of this device is that it is not reusable. In particular, in order to release the bundled cable, it is necessary to cut the strip. Once cut, the strip is no longer useful and must be discarded.

Another common cable tie wrap takes the form of a flat fabric strip having Velcro® hook and loop attachments to secure the wrap around a bundled cable. Although these types of wraps may be reusable, they require the user to first tightly bundle a cable prior to wrapping. Additionally, cables wrapped with this type of device are often prone to shifting unless the device is pulled very tight. Moreover, unless the fabric strip is somehow attached to the cable, this type of device is often misplaced or lost when not in use.

Other devices, particularly twist-ties, such as those used to close garbage bags, are unsightly, have only a short useful life, and present a risk of injury due to the metal wire contained therein.

Most recently, U.S. Pat. No. 5,729,872 to Ginocchio discloses a reusable cable clamp using a handcuff-like element having jaws that self sustain an open position while the bundled cables are inserted therein and which traverse a fixed path or trajectory to close on the bundled cables. Although the device is reusable, it is rather complicated in design and, therefore, relatively expensive to produce. Additionally, there are no means to attach the device to a cable to be bundled, thereby making the device prone to being lost or misplaced when not in use.

OBJECTS AND SUMMARY OF THE INVENTION

It is an object of the present invention to provide an improved cable management tie wrap that is inexpensive to produce and easy to install and remove.

It is another object of the present invention to provide a tie wrap that is reusable and that can be attached to a cable or wire to be bundled so that the device will not be misplaced when not in use.

It is yet another object of the present invention to provide a cable tie wrap that is compact and unobtrusive yet tightly bundles a cable thereby preventing the bundled cable from shifting.

The present invention is a cable tie wrap for bundling one or more cables, which generally includes a coupling body and an elastic cord defining a loop attached to a cord connection end of the coupling body. The coupling body includes a projection formed on an outer surface thereof for removably hooking the loop defined by the cord to the coupling body. Preferably, the projection includes an annular groove formed therein for removably nesting the elastic cord therein.

In a preferred embodiment, opposite ends of the elastic cord are attached to the cord connection end of the coupling body thereby defining the loop of the cord. Additionally, the elastic cord is preferably molded into the cord connection end of the coupling body. Alternatively, the cord includes a predefined loop at one end thereof.

Preferably, the projection further includes a retaining lip and the annular groove is formed between the outer surface of the coupling body and the retaining lip. The coupling body further preferably includes at least one cord retention rib formed on the outer surface thereof for preventing the cord from slipping off the outer surface of the body.

The tie wrap formed in accordance with the present invention further preferably includes means for attaching the tie wrap to a cable to be bundled so that the tie wrap is not misplaced when not in use. In particular, the coupling body preferably includes a cylindrical cable attachment portion that is generally perpendicular to the cord connection end of the coupling body for mounting the coupling body on a cable. The cable attachment portion includes a hole formed therethrough for insertion of a cable. The hole has a central axis generally perpendicular to the cord connection end of the coupling body. Alternatively, the cable attachment portion includes an open jaw for removable attachment of the coupling body to the cable.

The invention also includes a method for securing a bundle of cable, which method generally includes the steps of gathering a bundle of cable together, wrapping an elastic cord around the bundled cable and hooking the end of a loop defined by the cord to a coupling body to which the opposite end of the cord is attached. Preferably, the loop is nested within an annular groove formed around a projection of an outer surface of the coupling body. Thus, the tie wrap forms a band around the bundled cable thereby securing the bundled cable.

The method further preferably includes the step of mounting the coupling body on the cable or cables so that it is not misplaced when not in use. The coupling body may be permanently or removably attached to the cable being bundled.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENT

Figure 1:
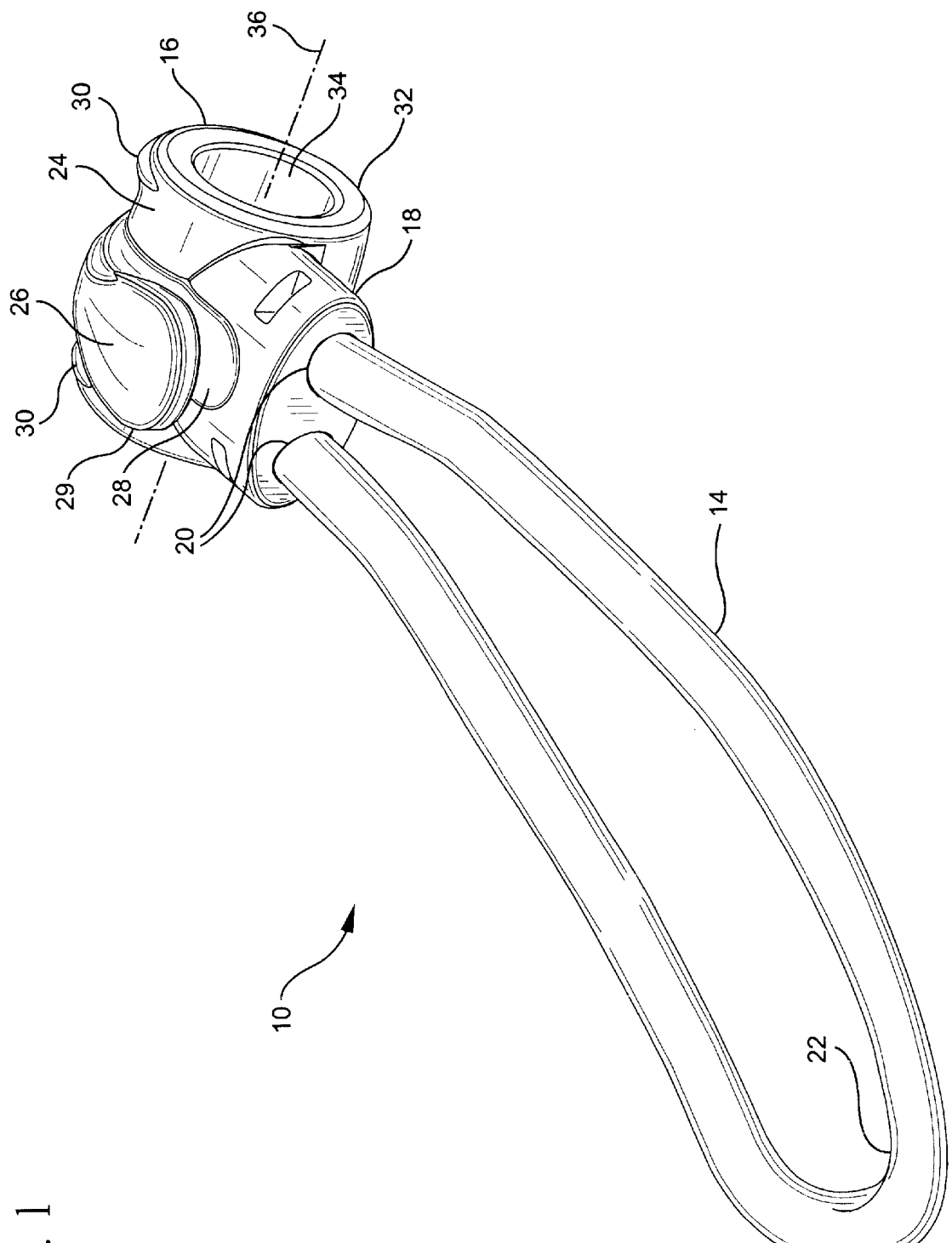
FIG. 1 is a rear top perspective view of the cable management tie wrap formed in accordance with the present invention.
Figure 2:
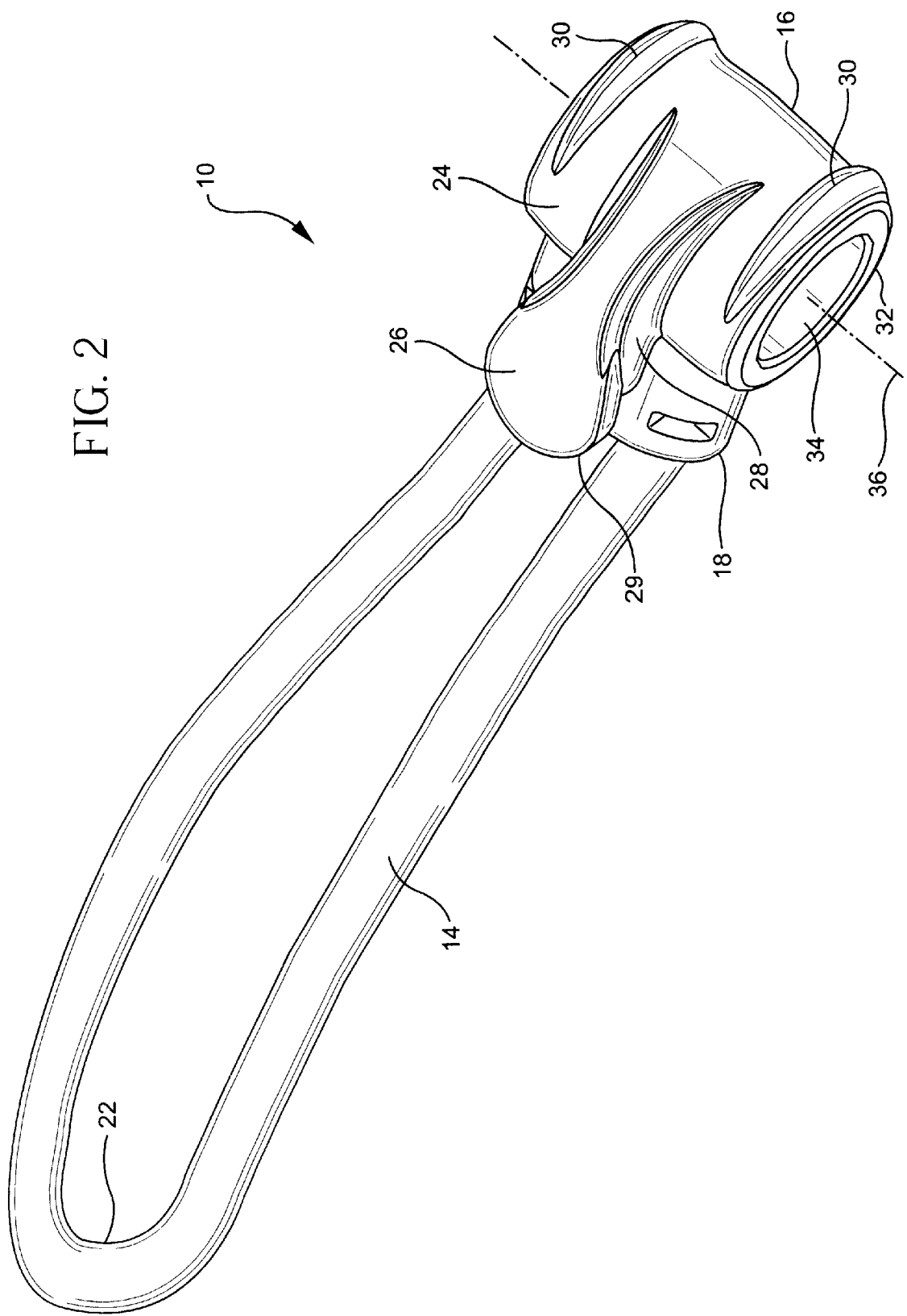
FIG. 2 is a front top perspective view of the cable management tie wrap formed in accordance with the present invention.

Referring first to FIGS. 1–4, a cable management tie wrap 10 formed in accordance with the present invention is shown. As shown particularly in FIGS. 3 and 4, the tie wrap 10 is designed to neatly bundle one or more electrical wires or cables 12 together. The tie wrap 10 generally includes an elastic cord 14 attached to a coupling body 16. The coupling body 16 is preferably made from an injection molded plastic and includes a cord connection end 18 for attaching the elastic cord 14 thereto. Preferably, the coupling body 16 is molded to the elastic cord 14 such that the cord is permanently connected to the body. Alternatively, the cord 14 may be attached to the coupling body 16 by other mechanical methods, such as by clamping, cinching or staking. As shown in FIG. 1, the connection end 18 of the body 16 preferably includes two holes 20 for securing opposite ends of the cord 14 therein whether by molding or other methods. Attached in this manner, the cord 14 forms a loop 22. In other alternative embodiments, the cord 14 may include a predefined loop, for example a lasso, at one end thereof whereby only one end of the cord opposite the loop would be attached to the body 16. The elastic cord is preferably about ⅛ inches in diameter; however, cords with other diameters can be used.

Formed on an outer surface 24 of the body 16 is a projection 26 for hooking the loop 22 defined by the cord 14 thereto. The projection 26 extends in the same general direction as the cord connection end 18 of the body 16 and includes a free-standing retaining lip 29 which overlies the cord connection portion of the coupling body. In particular, the overlying retaining lip 29 of the projection 26 defines an annular groove 28 between it and the outer surface 24 of the coupling body 16. The annular groove 28 is thus generally tangential to the outer surface 24 of the body 16. The annular groove 28 has a depth and a diameter preferably equal to or greater than the diameter of the cord 14. The retaining lip 29 helps to retain the loop 22 of the cord 14 between the projection 26 and the outer surface 24 of the body 16.

The coupling body 16 further preferably includes a cylindrical cable attachment portion 32, which is generally perpendicular to the cord connection end 18 of the body. The elastic cord 14, when tensioned by wrapping it around a bundled cable, is received by the annular groove 28 and partially rests on the outer surface 24 of the cylindrical cable attachment portion 32. To prevent the cord from slipping off the outer surface 24 of the body 16, the cable attachment portion 32 preferably includes two cord retention ribs 30 formed at least partially around the cylindrical attachment portion and situated near the opposite axial ends thereof.

The cable attachment portion 32 further preferably includes a cylindrical bore 34 formed therethrough, which is sized for insertion of a cable 12. Certain loudspeaker and microphone electrical cables are ¼ to ⅜ inches in diameter. Accordingly, the bore 34 of the cable attachment portion 32 would be similarly dimensioned or dimensioned just slightly larger to allow the coupling body 16 to be slipped onto the cable and positioned on the cable where desired. Preferably, the central axis 36 of the hole 34 is generally perpendicular to the axes of the cord connection holes 20 in the cord connection end 18 of the body 16. In this configuration, when the cord 14 is wrapped around a bundled cable 12, it will generally lie perpendicular to the cable.

Figure 3:
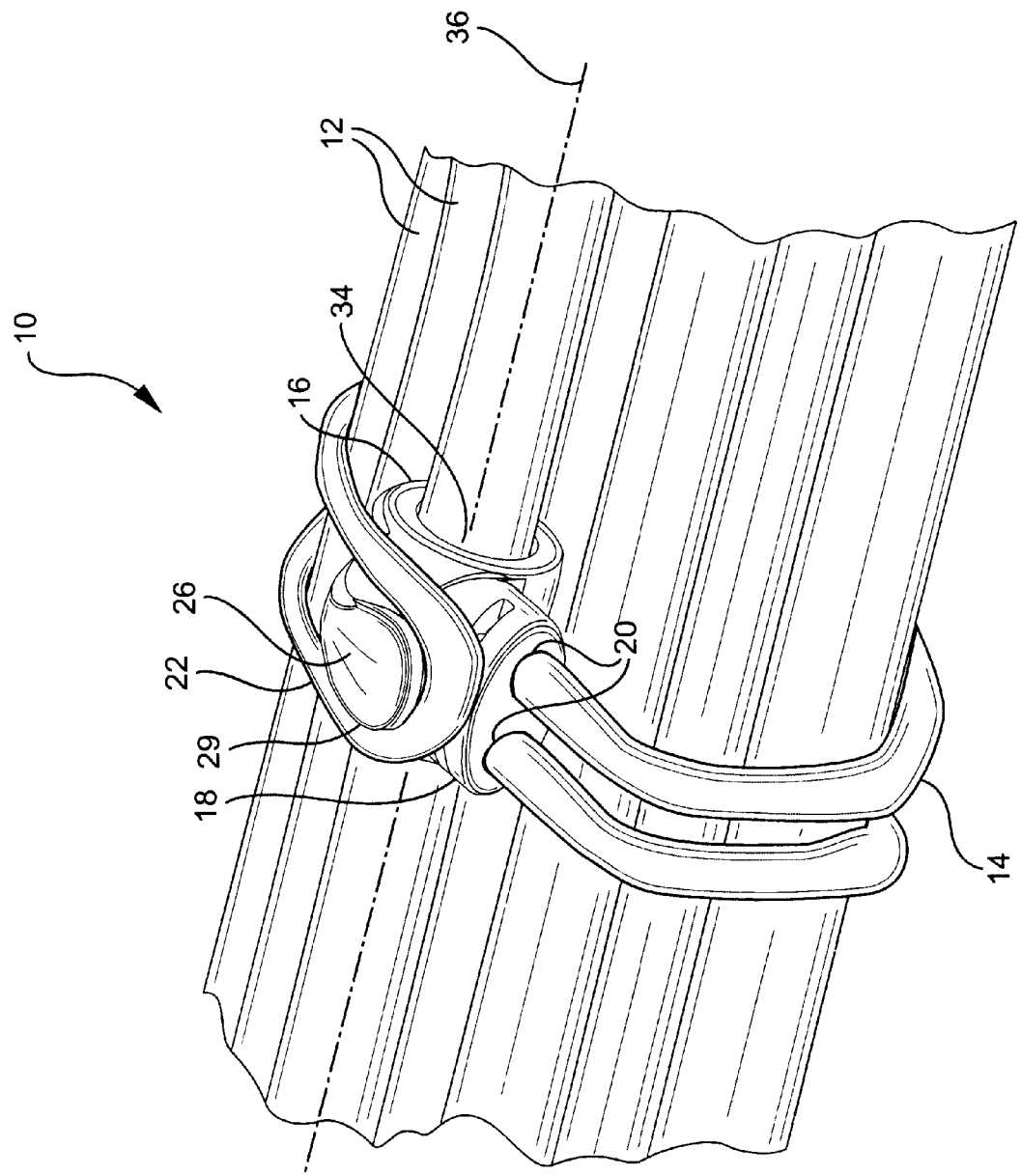
FIG. 3 is a top perspective view of the cable management tie wrap shown in FIGS. 1 and 2 in use.
Figure 4:
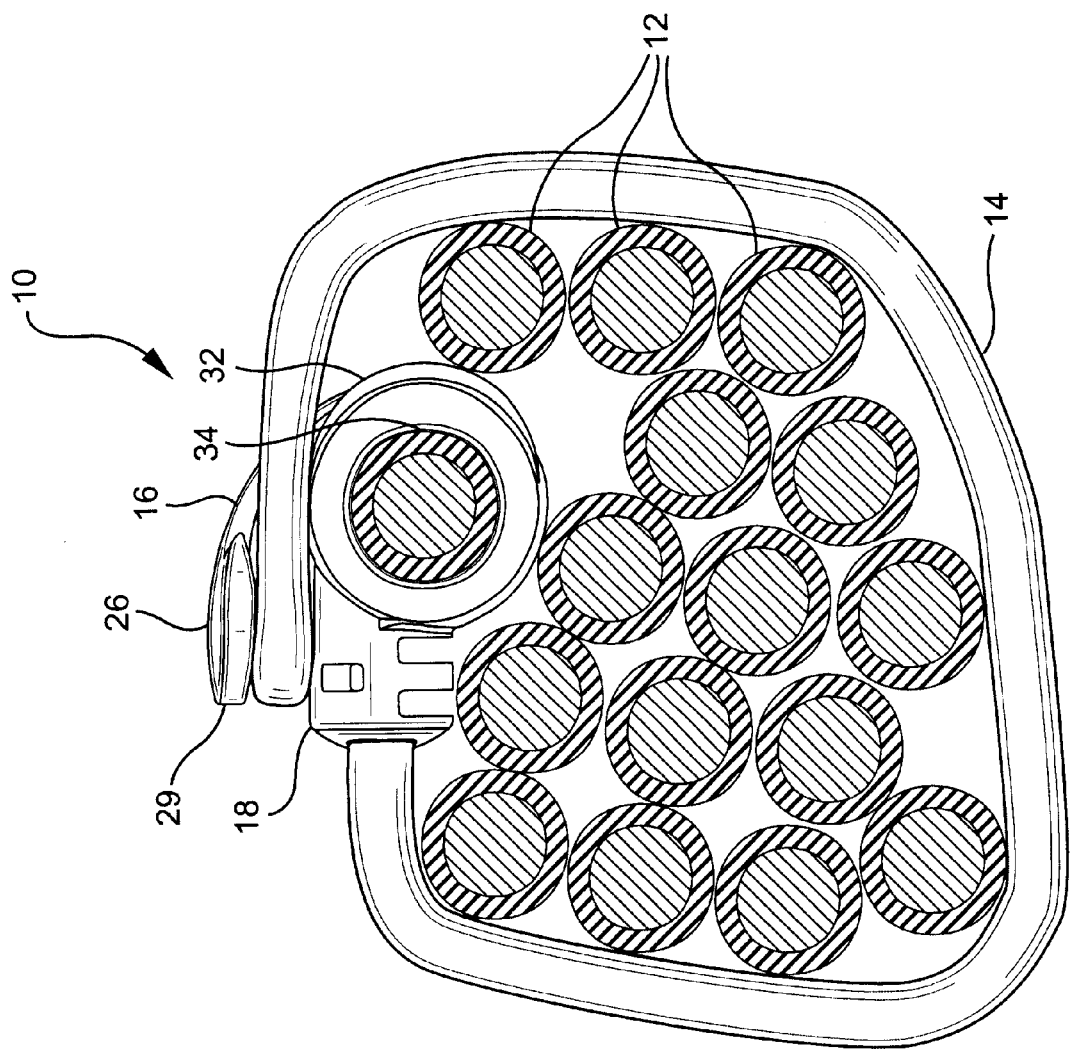
FIG. 4 is a side view of the tie wrap shown in FIG. 3.

As shown in FIGS. 3 and 4, the tie wrap 10 of this embodiment is attached to the cable 12 during assembly of the cable prior to mounting at least one of the end connectors (not shown) of the cable. In other words, a cable 12 is first inserted through the cable bore 34 of the cylindrical cable attachment portion 32 of the body and one or both of the cable connectors, such as jacks or plugs, are attached to the opposite ends of the cable, thereby retaining the tie wrap 10 therebetween. Thus, the tie wrap 10 is permanently attached to the cable 12.

Figure 5:
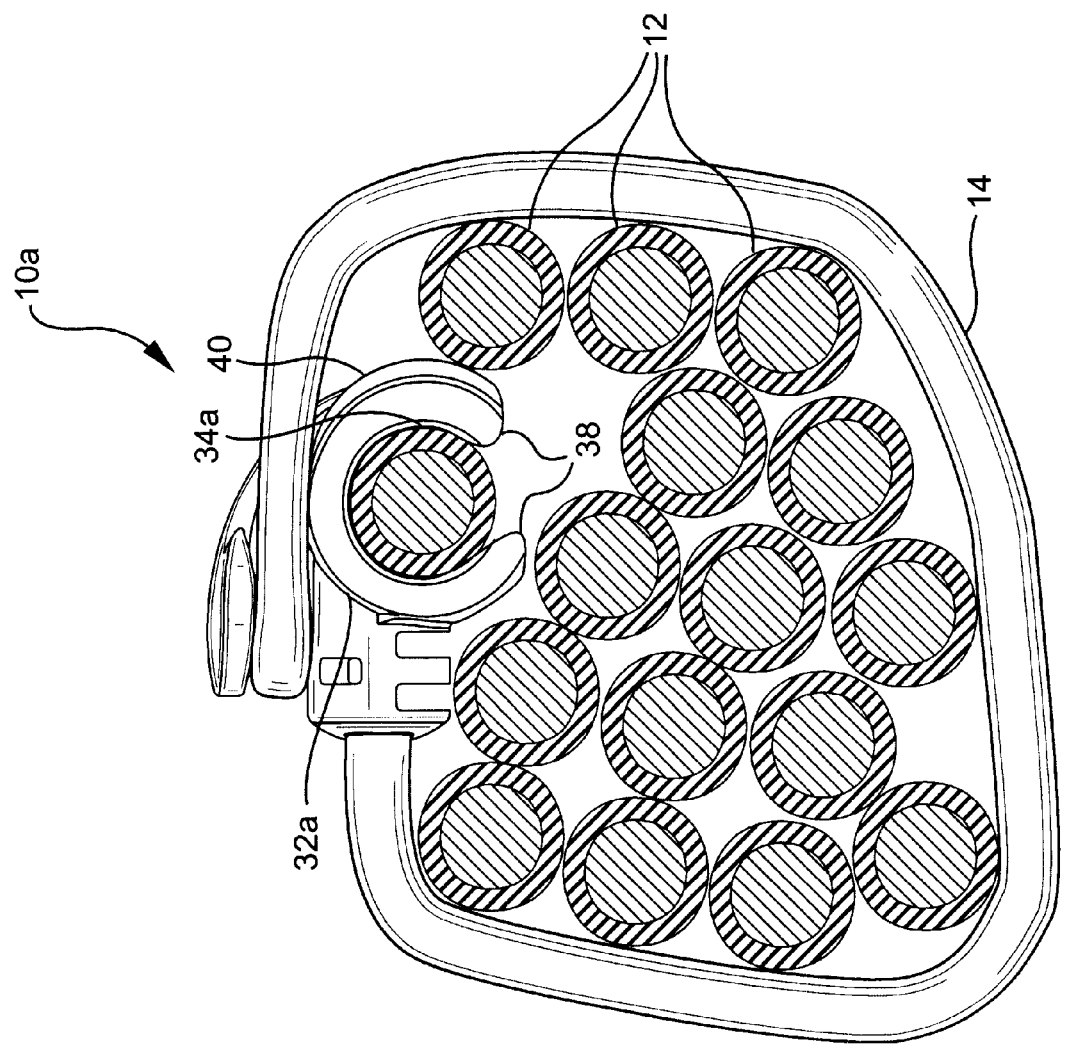
FIG. 5 is a side view of an alternative embodiment of the tie wrap formed in accordance with the present invention.

In an alternative embodiment, as shown in FIG. 5, a slot 38 is formed through the thickness of the sidewall of the cylindrical cable attachment portion 32a of the body 16a to partially longitudinally open the cable bore 34a, thereby forming an open jaw 40 that can be snapped on a cable 12 at any time. The opening of the jaw 40 is sized to be somewhat smaller than the outer diameter of the cable. The resiliency of the cable and/or the cable attachment portion 32a permits the cable to be forced through the slot 38 and into the cable bore 34a where it is closely received and held in place. Thus, the tie wrap formed in this manner may be secured to the finished cable anywhere along its length, and held in position by its close fit on the cable, and may be easily removed therefrom.

To use the tie wrap 10 formed in accordance with the present invention, a cable 12 to be bundled is first gathered together and the elastic cord 14 is pulled taut around the cables. The loop 22 formed by the cord 14 is then hooked to the projection 26 of the coupling body 16 to form a band around the bundle of cables. In particular, the cord 14 is nested within the annular groove 28 between the outer surface 24 of the body 16 and the retaining lip 29 of the projection 26 and is held tightly therein due to the tension of the cord 14. Additionally, the cord retention ribs 30 help to prevent the cord 14 from slipping off the outer surface 24 of the body. To unbundle the cable 12, the cord 14 is simply lifted out of the annular groove 28 and released from the projection 26, thereby returning the cord to an untensioned state. The cable or cables 12 are then free to be unbundled.

Thus, as result of the present invention, a simple and inexpensive tie wrap is provided that is easy to install and remove and is very compact and unobtrusive. Additionally, the tension in the elastic cord naturally holds the bundled cables tightly, thereby preventing any shifting of the cables. Finally, the reusable tie wrap can be made to be permanently attached or removable from a cable to be bundled so that the user does not have to search for a tie wrap upon each use.

Although illustrative embodiments of the present invention have been described herein with reference to the accompanying drawings, it is to be understood that the invention is not limited to those precise embodiments and that various other changes may be effected herein by one skilled in the art without departing from the scope or spirit of the invention.

What is claimed is:

1. A cable tie wrap for securing a bundled cable comprising:

a coupling body having a cord connection end and a projection formed on an outer surface thereof, the projection including an annular groove formed therein, the coupling body further including a cylindrical cable attachment portion for attachment of the coupling body to a cable; and an elastic cord defining a loop attached to the cord connection end of the coupling body, the elastic cord being removably nested within the annular groove of the projection for removably hooking the loop to the projection.

2. A cable tie wrap as defined by claim 1, wherein opposite ends of the elastic cord are attached to the cord connection end of the coupling body thereby defining the loop.

3. A cable tie wrap as defined by claim 1, wherein the elastic cord is molded into the cord connection end of the coupling body.

4. A cable tie wrap as defined by claim 1, wherein the cord includes a predefined loop at one end thereof.

5. A cable tie wrap as defined by claim 1, wherein the projection further includes a retaining lip, the annular groove being formed between the outer surface of the coupling body and the retaining lip.

6. A cable tie wrap as defined by claim 1, wherein the cable attachment portion is generally perpendicular to the cord connection end of the coupling body.

7. A cable tie wrap as defined by claim 1, wherein the cable attachment portion includes a hole formed therethrough for insertion of a cable.

8. A cable tie wrap as defined by claim 7, wherein the central axis of the hole formed in the cable attachment portion is generally perpendicular to the cord connection end of the coupling body.

9. A cable tie wrap as defined by claim 1, wherein the cable attachment portion includes a jaw for removable attachment of the coupling body to the cable.

10. A cable tie wrap for securing a bundled cable comprising:
- a coupling body having a cord connection end and a projection formed on an outer surface thereof, the projection including an annular groove formed therein; and
- an elastic cord defining a loop attached to the cord connection end of the coupling body, the elastic cord being removably nested within the annular groove of the projection for removably hooking the loop to the projection;
- wherein the coupling body further includes at least one cord retention rib formed on the outer surface thereof for preventing the cord from slipping off the outer surface of the body.

* * * * *